United States Patent [19]

Signor

[11] Patent Number: 4,641,444
[45] Date of Patent: Feb. 10, 1987

[54] LINE VIEWER

[76] Inventor: Robert G. Signor, 525 Herr's Ridge Rd., Gettysburg, Pa. 17325

[21] Appl. No.: 727,522

[22] Filed: Apr. 26, 1985

[51] Int. Cl.$^4$ ............................................. B41J 11/64
[52] U.S. Cl. ...................................... 40/352; 40/488; 40/491; 33/483; 33/485
[58] Field of Search ....................... 40/352, 488, 491; 33/483, 485

[56] References Cited

U.S. PATENT DOCUMENTS

| 213,981 | 4/1879 | Dow et al. | 40/352 |
| 2,632,962 | 3/1953 | Jacobson | 40/352 |
| 2,871,816 | 2/1959 | McConnell | 40/352 |
| 3,381,395 | 5/1968 | Bergland | 40/352 |

Primary Examiner—Robert Peshock
Assistant Examiner—Wenceslao J. Contreras
Attorney, Agent, or Firm—Daniel J. O'Connor

[57] ABSTRACT

A limited line viewer assembly for selectively viewing data on a computer printout sheet or related usage.

The device has multiple slide assemblies which are entirely contained, in the open and closed positions, within the confines of a surrounding housing assembly.

The slide assemblies and a housing wall have means which cooperate to effectively lock the device in an open or closed position until desired to be manually changed by a user.

15 Claims, 3 Drawing Figures

LINE VIEWER

BACKGROUND OF THE INVENTION

The use of various data reading aids has been known for a number of years. Those confronted with the task of working with pages of numerical or other data from which specific information must be read have found it difficult to read and use such data.

For example, it is known that bookkeepers and accountants, when confronted with large pages of rows and columns of data, often find it difficult to accurately study and extract the desired figures from such rows and columns because of the need to constantly check to see if one is in the proper row or column containing the desired information.

The problems of accurately reading data have been greatly increased over the years as nearly all professions and students now use and study some form of computer printout data which consists of a large number of rows and columns of numerical or other data, only certain parts of which are desired to be used for the particular work or study project involved.

The prior art patents which have attempted to address such problems are as follows: U.S. Pat. Nos. 2,871,816 (McConnell); 3,739,739 (Brase); 4,024,831 (Sperling); 3,408,977 (Colman); 3,269,752 (Lindaman). Each of the above patents have devised means for displaying an entire row or an entire column of data. For example, the U.S. Pat. Nos. 3,739,739 and 4,024,831 show a conventional ruler having a transparent portion in the middle thereof for the purpose of displaying an entire row of numbers on a large data sheet. The problem in use of such items is that the person must be constantly rechecking to be sure of obtaining data from the desired column. The other patents cited (U.S. Pat. Nos. 2,871,816; 3,408,977; and 3,269,752) also provide a central portion for displaying an entire row or column of data. In these three patents, the entire ruler is placed on a sliding or adjustable member so that the user of the device can relocate the ruler to another entire row or column as desired. Thus, since an entire row or column is displayed, recurring errors arise. For example, in the Colman patent an entire column is displayed by the adjustable ruler but, to extract isolated data, one would have to constantly check to be sure that the proper data row is being read.

One patent which has sought to solve the above problems is that to Natoli, U.S. Pat. No. 2,892,437. The Natoli patent provides a structure which masks or covers up the portions of a row of data which are not desired to be read or copied. In the Natoli structure, small fingers extend from the outer edge of a ruler and can be adjusted to mask data which is not desired to be read. There is no central viewing aperture in Natoli so that the data row being read is not effectively isolated and highlighted relative to the rest of the data on a page. In addition, the Natoli patent shows a usage of a relatively great number of small component parts making manufacture and assembly of the device very costly.

In use, the Natoli structure is also unwieldy and time consuming. For example, in a row containing twelve numbers, a user wishing to view only three of the figures in the row would have to cover up or mask nine figures to accomplish the task. For most business and study users, it would be less time consuming and simply easier to uncover desired data columns than to cover up or mask undesired data columns. This is because, for most applications, less than half of the data in a row is desired to be copied or studied.

The sliding fingers of the Natoli patent are also subject to being jostled or bumped out of the desired masking position as the ruler is touched or moved by one using it to read or copy data from a large sheet such as a computer printout or bookkeeping form.

It can therefore be seen that it would be extremely useful in the data viewing art to provide an assembly which allows limited line viewing, i.e. permits only a portion of a row or column to be read or studied, without the disadvantages inherent in a structure such as that taught by U.S. Pat. No. 2,892,437.

Accordingly, it is an object of the present invention to provide a limited line viewing assembly which allows the limited data viewed to be effectively isolated from the remaining numbers on a large data sheet.

It is a further object of this invention to provide a limited line viewer which may be easily and economically manufactured by using a relatively smaller number of component parts while still performing the desired advantageous functions.

It is a further object of the present invention to provide a limited line viewer having component parts which are easily retained in the desired viewing or covering position so that slight movement or bumping of the device does not change the desired reading position or the component parts.

It is a further object of the present invention to provide a data viewing assembly having smaller component parts which cannot be easily separated from the main housing thereby helping to prevent loss of such component parts or injury to others by reason of separated component parts.

These and other objects and advantages of the present invention will be apparent to those of skill in the art in the detailed description set forth herein.

SUMMARY OF THE INVENTION

The invention utilizes a main housing and multiple slide assemblies therein to expose the data desired to be viewed. The slide assemblies, in operation, have an open and closed position and in either position are contained entirely within the bounds of the housing assembly. Each slide assembly has a finger tab on the upper surface thereof and a securing tab on the lower surface thereof.

The main housing assembly comprises upper, lower, lateral and front wall portions. In its closed position, the slide assembly is adjacent to an interior wall of the front wall portion. The upper, lower and lateral wall elements provide slideways for the multiple slide assemblies contained within the main housing. The lower wall portion has notch and edge means thereon to provide an easy locking of the slide assemblies in the desired open or closed positions.

A central opening is formed by a spacing between the front wall and the other wall portions so that, when a selected slide assembly is placed in its open position, the desired data is exposed in the central opening and can be easily read and copied by the user.

DETAILED DESCRIPTION OF THE INVENTION

Figure 1:
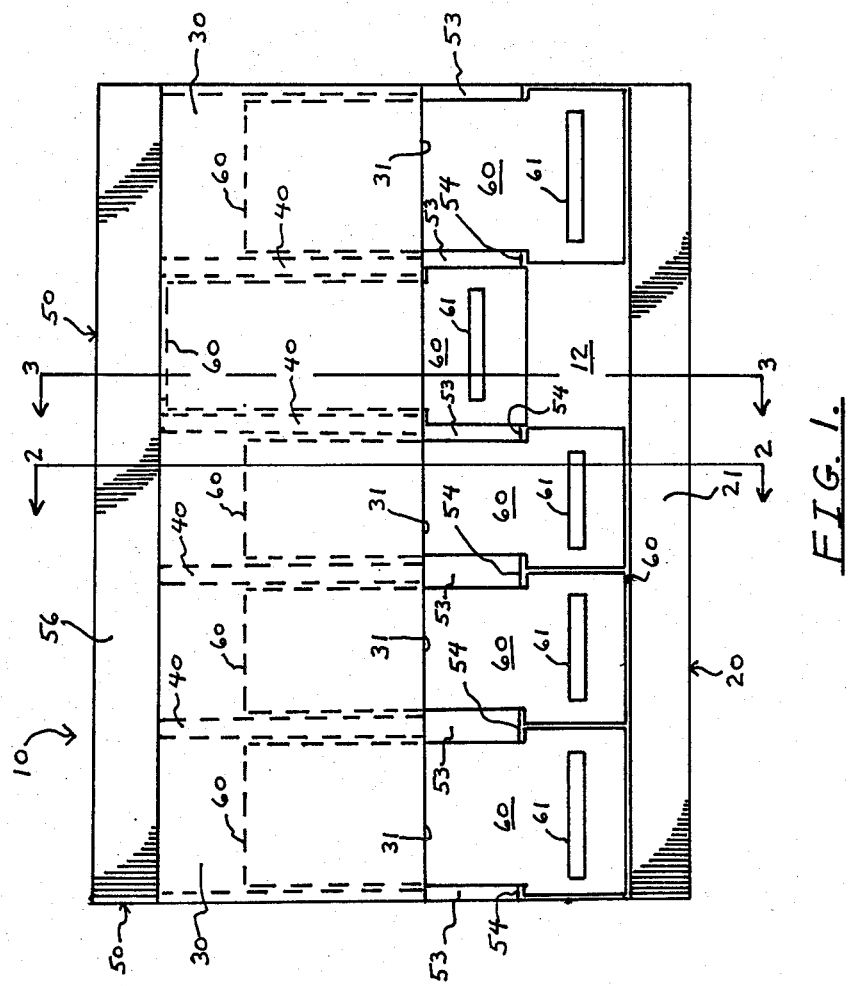
FIG. 1 is a top elevational view of a portion of the device showing the slide assemblies in relation to the upper, front and lateral wall portions and in relation to the overall device.
Figure 2:
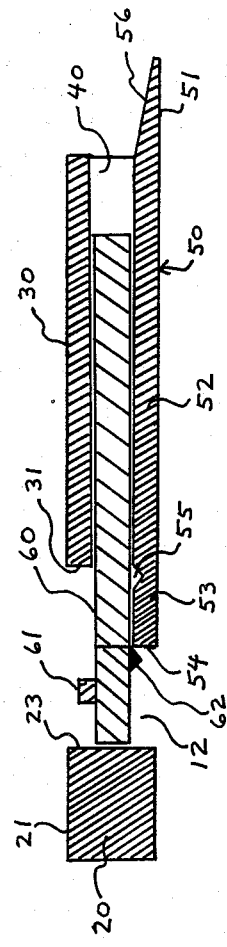
FIG. 2 is a sectional cutaway view along line 2—2 of FIG. 1 showing the slide assembly in its closed position.

Referring now to the drawings in which like numerals have been used to designate like component parts and, specifically, with reference to FIGS. 1 and 2, the device is shown with the slide assemblies in the closed or data covering position.

The overall or main housing 10 has four principal components or sections of importance to the present invention, those being the front wall section 20, the upper wall portion 30, the lateral wall sections 40 and the lower wall portion 50. The upper 30, lateral 40 and lower 50 wall portions are constructed or formed so as to form a slideway for the slide element 60.

As shown in its closed position in FIG. 2, the slide assembly 60 is moved into position adjacent to and abutting the interior 23 of the front wall section 20. In this position, the data viewing aperture 12 is blocked so that no data can be viewed at this particular slide assembly 60 of the limited line viewer.

The slide assembly 60 has secured to the upper wall thereof an elongated raised finger tab 61 by which the user may move the slide assembly 60 between the open and closed positions of the device. A triangular shaped securing tab 62 is located on the lower wall of the slide assembly 60 and, in use of the invention, it is contemplated that the securing tab 62 would lie interiorly of the raised finger tab 61 as shown in FIG. 2. The slide assembly 60 is retained in its closed position by means of securing tab 62 which is restrained from movement via contact with the front edge 54 of the front of the lower wall portion 53. It is to be understood that there is sufficient sliding clearance formed by walls 30, 40 and 50 that the slide assembly 60 can be manually pushed to the open position and out of the closed position wherein the securing tab 62 is restrained by the edge 54.

The lower wall portion 50 has three sections or zones therein. The rear section 51 is of a trapezoidal cross section as shown and may, on the top thereof at 56, have conventional ruler markings in inches, centimeters or other desired units. The lower wall 50 has a center section 52 which cooperates with the top wall 30 and lateral wall 40 to form the slideway for the slide assembly 60. The lower wall 50 also has a front section 53 which has a leading edge 54, previously referred to, and a triangular shaped securing notch 55 which corresponds in depth and width to the securing tab 62 mounted on the lower portion of the slide assembly 60.

Figure 3:
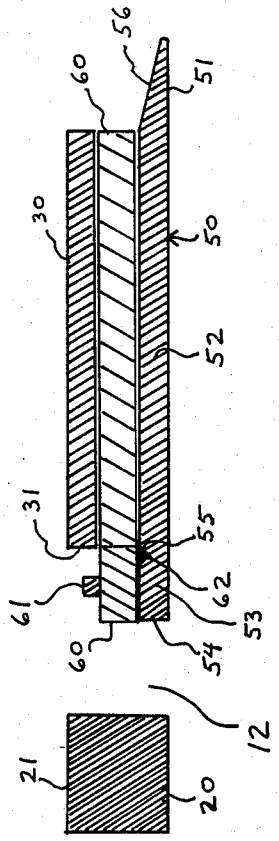
FIG. 3 is a view along line 3—3 of FIG. 1 showing the slide assembly in its open position.

Thus, in operation and referring to FIGS. 2 and 3, when it is desired to move the slide assembly 60 to its open position to open the data aperture 12, the assembly is pushed at 61 with sufficient force to overcome the resistance created by the location of tab 62 and edge 54, sliding the assembly 60 to the right. The assembly 60 slides to the right until securing tab 62 come into alignment with and drops into the securing notch 55. The assembly is thus lightly secured in its open position until it is desired to manually move it back to the closed position.

It is to be understood that the lower wall 50 could be formed with plural notches 55 so that tab 62 could be located to vary the size of aperture 12 so that the particular size or number of data elements to be viewed can be accommodated It is a feature of the present invention that slide assemblies 60 cannot be easily separated from the overall assembly. As shown most clearly in FIGS. 1 and 3, when a slide assembly 60 is in an open position, it is stopped from further movement to the right as the T-section of the slide assembly 60 abuts lateral wall portions 40. When moved to the closed position of FIG. 2, the slide assembly 60 abuts section 23 of front wall 20 and cannot be inadvertently separated from the overall device by reason of its elongated shape confined in the slideway formed by walls 30, 40 and 50.

Besides the conventional ruler markings at 56, there may also be placed standard ruler markings at the top portion 21 of the front wall 20 as deemed desirable.

The device may be constructed of any suitable manufacturing materials such as plastics, wood or metal. It is also to be understood that the device may be manufactured in different sizes and dimensions to suit the particular application. It was previously mentioned that plural notches 55 could be used to vary the size of aperture 12. Further, such dimensions as the distance between lateral walls 40 could be varied to change the size of viewing aperture 12 depending on the particular data arrangement for which the limited line viewer is to be used.

It is further noted that end portions of the limited line viewer ruler would have elements whereby the front walls 20 would be secured to the slideway portion formed by walls 30, 40 and 50. Thus, a one-piece main housing assembly 10 is formed with the various slide assemblies 60 fitting therein.

From the foregoing description of the invention, it can be seen that numerous advantages accrue from the use of the limited line viewer of the present construction. Of significant importance relative to prior art teachings such as those of U.S. Pat. No. 2,892,437 is the fact that the construction allows the data to be viewed within the confines or borders of the device at aperture 12 thus tending to highlight and make easier to read the data on a line desired. It is also apparent that various columns of data can be exposed as desired by the user.

The locking features provided by the interaction of tab 62, edge 54 and securing notch 55 also result in advantages to the present device. For example, in the closed position of FIG. 2, tab 62 abuts against edge 54 so that data under this particular slide element 60 cannot be viewed. The locking feature means that movement or jostling of the device will not result in the inadvertent opening of aperture 12 thus resulting in less likelihood of error for the user. Conversely, in FIG. 3, when the device is in an open position, tab 62 rests in the securing notch 55 so that inadvertent closing of the aperture 12 will not be permitted.

It is also an important aspect of the invention that data to be viewed is uncovered rather than undesired data being masked as is known in the prior art. In the most frequent applications, this feature results in time saving for a user of the device. For example, an auditor examining a data page having twelve columns of numbers would likely only need to view two or three of the columns to perform the required task. It is apparent that the uncovering of three data columns is quicker and more efficient than the covering of nine data columns.

Once the device is fabricated of available wood, metal or plastics compounds, it can be seen from the drawings that the smaller component slide assemblies 60 cannot be easily separated from the overall assembly 10. Thus, loss of these component parts is prevented giving the device a longer useful life. The retention of slide assemblies 60 in the overall housing also results in less likelihood of injury to persons from separated component parts, an important feature of any device in an age of increasing products liability litigation.

The importance of selective viewing through a central opening 12 has been noted as a feature which tends to highlight data to be viewed. Further, with the ruler construction surrounding the aperture 12, a line can be drawn around a desired data row using the straight edges of front wall 20 and section 51 of the lower wall 50, thus rendering the data more useable for later reference.

The device can also be used for conventional book reading or proof reading by highlighting a particular line to be read or proofed. In this mode, all of the slide assemblies 60 are placed in the open position of FIG. 3 and the desired line or lines are conveniently highlighted within the borders of the viewer assembly.

From the foregoing description and claims appended hereto, it can be seen that the present invention incorporates a novel design which will be highly useful and practical to those of skill in the data viewing arts. As the device is used in commerce, the advantages of the invention will become apparent to those who utilize the limited line viewer assembly.

I claim:

1. A limited line viewer assembly comprising:
   a plurality of slide assemblies (60) arranged in a ruler structure,
   said slide assemblies (60) being slideable in passages formed by upper walls (30), lateral walls (40) and bottom walls (50),
   said limited line viewer assembly further comprising a front wall (20),
   means for sliding said slide assemblies (60) into adjacent relation to said front wall (20) to provide means for closing an aperture (12) formed between said front wall (20) and said bottom walls (50),
   means for sliding said slide assemblies (60) away from said front wall (20) to provide means for opening an aperture (12) formed between said front wall (20) and said bottom wall (50),
   means whereby data may be viewed through said aperture (12) such that said data is viewed within the confines of the limited line viewer assembly,
   means whereby some of the plural slide assemblies (60) may be open and some may be closed so that only desired data is viewed within the confines of the limited line viewer assembly,
   wherein said slide assemblies (60) have securing tabs (62) mounted on a lower surface thereof and means whereby said tabs (62) abut a leading edge (54) of said bottom wall (50) in the closed position of the slide assembly and means whereby said securing tabs (62) rest in a securing notch (55) formed in the upper surface of said bottom wall (50) in the open position of the slide assembly,
   wherein said slide assemblies (60) rest entirely on said bottom wall means (50) in an open position of the device and wherein said slide assemblies (60) extend over an edge (54) of said bottom wall means (50) in a closed position of the device.

2. The assembly of claim 1 wherein said bottom walls (50) have first (51), second (52) and third (53) sections or zones as a part thereof.

3. The assembly of claim 2 wherein said first section (51) of said bottom wall means (50) is trapezoidal in cross-section and has means for mounting measuring indicators on the top portion (56) thereof.

4. The assembly of claim 2 wherein said second section (52) of said bottom wall means (50) is rectangular in cross-section.

5. The assembly of claim 2 wherein said third section (53) of said bottom wall means (50) has a securing notch (55) formed in the top thereof and a leading edge means (54).

6. The assembly of claim 1 wherein said front wall (20) is rectangular in cross-section.

7. The assembly of claim 1 wherein slide assemblies (60) are T-shaped to provide means for abuttment against lateral walls (40) in a data displaying position wherein viewing area (12) is opened.

8. The assembly of claim 1 wherein said slide assemblies (60) have finger tabs (61) on an upper surface thereof to allow manual operation of the device.

9. The assembly of claim 1 wherein said front wall (20) has means for mounting measuring indicators on the top portion (21) thereof.

10. The assembly of claim 1 wherein said lateral walls (40) extend to support the entire width of upper walls (30).

11. The assembly of claim 1 wherein said bottom walls (50) provide support for said upper (30) and lateral (40) walls and wherein said bottom walls are wider than said upper and lateral walls.

12. The assembly of claim 1 wherein said upper walls (30) are rectangular in cross-section.

13. The assembly of claim 5 wherein said securing notch (55) is triangular in cross-section.

14. The assembly of claim 8 wherein said finger tabs (61) are rectangular in cross-section.

15. The assembly of claim 1 wherein said securing tabs (62) are triangular in cross-section.

* * * * *